(12) United States Patent
Stiles et al.

(10) Patent No.: US 7,112,373 B2
(45) Date of Patent: Sep. 26, 2006

(54) OXYGEN SUBSTITUTED BARIUM THIOALUMINATE PHOSPHOR MATERIALS

(75) Inventors: James Alexander Robert Stiles, Toronto (CA); John Wesley Moore, Richmond Hill (CA); Vincent Joseph Alfred Pugliese, Oakville (CA); Hiroki Hamada, Osaka (JP); Isao Yoshida, Ibaraki (JP)

(73) Assignees: Sanyo Electric Co., Ltd., Osaka (JP); iFire Technology Inc., Fort Saskatchewan (CA)

( * ) Notice: Subject to any disclaimer, the term of this patent is extended or adjusted under 35 U.S.C. 154(b) by 0 days.

(21) Appl. No.: 10/417,901

(22) Filed: Apr. 17, 2003

(65) Prior Publication Data

US 2004/0013906 A1    Jan. 22, 2004

Related U.S. Application Data

(60) Provisional application No. 60/372,781, filed on Apr. 17, 2002.

(51) Int. Cl.
*H05B 33/14* (2006.01)
*C09K 11/62* (2006.01)
*C09K 11/64* (2006.01)

(52) U.S. Cl. .............. 428/690; 428/917; 313/503; 313/509; 252/301.405

(58) Field of Classification Search .......... 428/690, 428/917; 313/503, 509; 252/301.405
See application file for complete search history.

(56) References Cited

U.S. PATENT DOCUMENTS 5,656,888 A    8/1997   Sun et al.
5,656,999 A    8/1997   Campbell

FOREIGN PATENT DOCUMENTS

| EP | 1 170 350 A2 | 1/2002 |
|----|--------------|--------|
| EP | 1 170 351 A2 | 1/2002 |
| EP | 1 191 081 A2 | 3/2002 |
| EP | 1 279 718 A2 | 1/2003 |
| JP | A 2000 81483 | 3/2000 |
| JP | 2001-262140 A * | 9/2001 |

OTHER PUBLICATIONS

Youji Inque, et al., Atomic Composition and Structural Preperties of Blue Emitting $BaAl_2S_4$:Eu Electroluminescent Thin Films, *Jpn. J. Appl Phys*, vol. 40 (2001), pp. 2451-2455, Japan Society of Applied Physics, 2001.

Y. Izumi et al., "An X-ray Photoelectron Spectroscopy Study of Elements Chemical States in $SrGa_2S_4$:CE Blue Electroluminescent Thin Films," Jpn. J. Appl. Phys. vol. 38 (1999) pp. 4798-4801, Aug. 1999.

* cited by examiner

*Primary Examiner*—Dawn L. Garrett
(74) *Attorney, Agent, or Firm*—Fay, Sharpe, Fagan, Minnich & McKee, LLP

(57) ABSTRACT

A thin film phosphor for an electroluminescent device, the phosphor being selected from the group consisting of thioaluminates, thiogallates and thioindates having at least one cation selected from elements of Groups IIA and IIB of the Periodic Table of Elements. The phosphor being activated by a rare earth metal and containing oxygen as a partial substitute for a portion of the sulphur in the crystal lattice of the thiogallate, thioindate or thioaluminate. The phosphor is a single phase homogeneous compound and provides improved luminance stability. An electroluminescent device comprising the thin film phosphor is also described and methods of making the phosphor of the invention.

31 Claims, 13 Drawing Sheets

OXYGEN SUBSTITUTED BARIUM THIOALUMINATE PHOSPHOR MATERIALS

This application claims priority from U.S. Provisional Application No. 60/372,781; filed 17 Apr. 2002.

FIELD OF THE INVENTION

The present invention relates to phosphor materials which are used as thin films in electroluminescent displays. More specifically, the invention relates to oxygen substitution in such phosphor materials and in particular, oxygen substituted barium thioaluminate phosphor materials.

The invention also relates to improving the luminance of and optimizing the emission spectra of the phosphor materials when they are used for full color electroluminescent displays, particularly those employing thick film dielectric layers with a high dielectric constant.

BACKGROUND TO THE INVENTION

Thick film dielectric structures provide for superior resistance to dielectric breakdown, as well as a reduced operating voltage, compared to thin film electroluminescent (TFEL) displays e.g. as exemplified by U.S. Pat. No. 5,432,015. The thick film dielectric structure when it is deposited on a ceramic substrate will withstand higher processing temperatures than TFEL devices, which are typically fabricated on glass substrates. This increased high temperature tolerance facilitates annealing of phosphor films at higher temperatures to improve their luminosity. With these advantages and with recent advances in blue-emitting phosphor materials, displays have approached the luminosity and color coordinates required to achieve the technical performance of traditional cathode ray tube (CRT) displays. Nevertheless, further improvement in blue phosphor performance is required to simplify display design, to improve display reliability by lowering operating voltages and to keep pace with a trend towards higher color temperature specifications for displays.

Cerium-activated strontium sulphide phosphor materials have traditionally been used in electroluminescent displays for blue colors while manganese-activated zinc sulphide have been employed for red and green colors. The optical emission from these phosphor materials must be passed through an appropriate chromatic filter to achieve the necessary color coordinates for red, green and blue sub-pixels, resulting in a loss of luminance and energy efficiency. The manganese-activated zinc sulphide phosphor has a relatively high electrical to optical energy conversion efficiency of up to about 10 lumens per Watt of input power. Cerium-activated strontium sulphide phosphor has an energy conversion efficiency of 1 lumen per Watt, which is relatively high for blue emission. However, the spectral emission for these phosphors is quite wide, with spectral emission for the zinc sulphide-based phosphor material spanning the color spectrum from green to red and that for the strontium sulphide-based material spanning the range from blue to green. This necessitates the use of the optical filters. The spectral emission of the cerium-activated strontium sulphide phosphor can be shifted to some degree towards the blue by controlling the deposition conditions and activator concentration, but not to the extent required to eliminate the need for an optical filter.

Alternative blue phosphor materials having narrower emission spectra to provide the color coordinates required for a blue sub-pixel have also been developed. These phosphor materials include cerium-activated alkaline earth thiogallate compounds which provide good blue color coordinates, but exhibit relatively poor luminosity and stability. The relatively poor luminosity is in part due to their relatively high dielectric constant and optical index of refraction, which decreases the efficiency with which light generated within the materials can be extracted to provide useful luminance.

Thiogallate and thioaluminate phosphor materials containing oxygen have also been developed. U.S. Pat. No. 5,656,888 discloses a method in which minor concentrations of oxygen are added to improve the luminous efficiency and CIE colour coordinates of alkaline earth thiogallate phosphor materials. In the method, an oxide is added to the deposition source materials or alternatively, oxygen is added to the deposition atmosphere. However, excessive oxygen doping to concentrations higher than 4 atomic percent in $Sr_{0.5}Ca_{0.5}Ga_2S_4$:Ce resulted in a loss of luminous efficiency due to the undesirable formation of oxides as a separate crystal phase.

Japanese patent application 2000-081483 discloses a method for the oxidation of a vacuum deposited two-layered europium activated alkaline earth thioaluminate phosphor film. Oxygen is added to the annealing process which is carried out at a temperature in the range of 700° C. to 1000° C. under an atmosphere of argon containing 1 to 20% oxygen for a time of about 2 minutes. The annealing process is carried out after the thioaluminate film is coated with a layer of zinc sulphide of thickness in the range of 1000 to 5000 Angstroms in order that the thioaluminate material is not in direct contact with the annealing atmosphere. The annealed thioaluminate film is reported to fractionate into two layers, one comprising the alkaline earth element of aluminum, sulphur and oxygen and the other comprising aluminum oxide.

The aforementioned layered oxidized phosphors are also described in the Japanese Journal of Applied Physics Vol. 40, 2001, pages 2451–55. Annealing of the phosphor is carried out at a temperature of 920° C. under an argon atmosphere unintentionally doped with oxygen. Oxygen is thought to be inadvertently introduced during film deposition and annealing or from the presence of oxide in the deposition source materials. The x-ray diffraction data for the phosphor film shows the presence of barium thioaluminate, alumina and an amorphous phase that is tentatively identified as amorphous barium aluminate. Within the layered film the XPS data indicates an aluminum to oxygen atomic ratio in the aluminum oxide layer of 2:3, meaning that this layer consists essentially of $Al_2O_3$. The ratio of elements in the layer containing barium, aluminum, sulphur and oxygen indicates a composition with an empirical stoichiometry of approximately $BaAl_2S_{2.6}O_{1.4}$ such that the stated average empirical composition of the two layers together is $BaAl_2O_{2.1}S_{1.9}$.

European patent application 1,170,351 A2 discloses a barium aluminum oxide phosphor matrix material doped with sulfur to improve the spectral emission properties. A first phosphor composition of Ba:Al:O:S:Eu is deposited by reactive sputtering in a hydrogen sulphide containing atmosphere followed by annealing at 750° C. in air to introduce oxygen. This composition corresponds to the empirical formula $BaAl_{2.19}O_{7.93}S_{0.95}Eu_{0.03}$, which has a very high oxygen to sulphur ratio, with the overall composition similar to a mixture of europium doped $Al_2O_3$ and $BaSO_4$. A second composition even richer in oxygen that the first described above is formed by introducing oxygen into the vacuum deposition atmosphere and annealing under vacuum. The phosphor stability is stated to be improved if deposition and annealing conditions are adjusted so that the ratio of sulphur to oxygen plus sulfur is in the range of 0.7 to 0.9 corresponding to an oxygen to sulphur ratio from 0.11 to 0.43. The phosphor compositions disclosed are admittedly matrix materials containing sulphide and oxide in which the function of the oxide in the phosphor is to provide a stable coating on the sulphide component to stabilize it against degradation by exposure to the ambient environment.

European patent application 1,170,350 A2 discloses the use of an electroluminescent phosphor stack containing a layer comprising a matrix material of barium aluminate and a sulphur-bearing compound. The method to produce the aluminate phosphor material is similar to that taught in EP 1,170,351 with an average sulphur to sulphur plus oxygen ratio of 0.7 and 0.9 or between 0.02 and 0.5, the latter range having an oxygen to sulphur ratio between 1 and 50.

The aformentioned oxysulphide phosphor materials are typically matrix materials or layered structures containing an oxide and a sulphide layer, in which any of the oxygen introduced into the materials is done so in an uncontrolled or inadvertent manner. Such an uncontrolled and/or inadvertent addition of oxygen adversely affects the crystal lattice structure of the phosphor material leading to negative effects on luminosity and/or stability of the phosphor material.

In view of the foregoing, there remains a need to develop new phosphors having improved properties that obviate the shortcomings of the prior art and that also have use as thin films in electroluminescent displays. The present invention fulfills this and other needs.

SUMMARY OF THE INVENTION

The present invention provides novel oxysulfide thin film phosphors for use in electroluminescent devices. The oxysulfide thin film phosphors have good luminosity and stability and are essentially homogeneous in that they are not matrix materials or layered films. The present invention also provides a method to make such oxysulfide thin film phosphors, whereby in the method a desired quantity of oxygen is controllably introduced to the deposition materials resulting in the deposition of a single phase homogenous phosphor film where such oxygen does not substantially distort or negatively affect the crystal lattice structure of the phosphor. This results in improved luminance and stability of the phosphor.

In accordance with an aspect of the present invention there is provided a thin film phosphor for an electroluminescent device, the phosphor being selected from the group of chemical compounds consisting of thioaluminates, thiogallates and thioindates having at least one cation selected from elements of Groups IIA and IIB of the Periodic Table of Elements, the phosphor being activated by a rare earth metal and wherein atomic vacancies and a portion of the sulphur in the crystal lattice are replaced with oxygen. In a preferred embodiment, the thin film phosphor is a thioaluminate or thiogallate having at least one cation selected from elements of Groups IIA and IIB of the Periodic Table of Elements, the phosphor being activated by a rare earth metal and wherein atomic vacancies and a portion of the sulphur in the crystal lattice are replaced with oxygen.

In accordance with another aspect of the present invention there is provided a singleuniform thin film phosphor compound for an electroluminescent device, the phosphor being selected from the group of chemical compounds consisting of thioaluminates, thiogallates and thioindates having at least one cation selected from elements of Groups IIA and IIB of the Periodic Table of Elements, the phosphor being activated by a rare earth metal and wherein atomic vacancies and a portion of the sulphur in the crystal lattice are replaced with oxygen. Preferred compounds are selected from thioaluminates and thioindates.

The invention is also directed to compounds wherein a selected portion of the aluminum, gallium or indium in the compounds is replaced by at least one different atomic species selected from scandium, yttrium or lanthanum. In this aspect there is provided a thin film phosphor for an electroluminescent device, said phosphor being selected from the group consisting of thioaluminates, thiogallates and thioindates having at least one cation selected from elements of Groups IIA and IIB of the Periodic Table of Elements, said phosphor being activated by a rare earth metal and containing a Group IIIB element as a partial substitute for a portion of aluminum, gallium or indium of said thiogallate, thioindate and thioaluminate and further containing oxygen as a partial substitute for the sulphur in the thiogallate, thioindate or thioaluminate.

The invention further encompasses phosphor compounds where a co-activator species is present in quantities sufficient to enhance the luminosity of the activator species present in the phosphor.

The phosphors of the invention have incorporated therein a controlled and desired amount of oxygen that provides for an increased luminescence of the phosphor composition. The introduction of oxygen in a controlled and desired quantity substantially avoids the formation of oxides in a separate crystal phase of the phosphor thus essentially precluding the formation of matrix or layered phosphor materials.

According to an aspect of the present invention is a phosphor material having the formula:

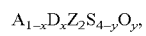

wherein
A is a Group IIA or Group IIB cation;
D is a rare earth metal;
Z is selected from Al, Ga and In;
$0.005 < x < 0.1$; and
$1.0 < y < 3.0$, wherein said phosphor material is a single phase homogeneous material
In a more preferred aspect, $1.6 < y < 2.4$.

The partial substitution of oxygen for sulfur in the phosphor structure does not substantially alter the crystal lattice structure of the phosphor.

According to still a further aspect of the present invention is a phosphor material having the formula:

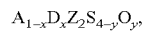

wherein
A is a Group IIA or Group IIB cation, where said cation is not gallium;
D is a rare earth metal;
Z is selected from Al, Ga and In;
$0.005 < x < 0.1$; and
$1.0 < y < 3.0$.

In a preferred embodiment of the present invention, the phosphor is a material having the formula $Ba_{1-x}D_xAl_2S_{4-y}O_y$, wherein $0.005 < x < 0.1$ and $1.6 < y < 2.4$.

In another embodiment, said rare earth metal is selected from europium and/or cerium, most preferably europium.

Preferably, the amount of europium is between about 2–7 atomic percent of the Group IIA or IIB cation present and oxygen replaces between about 45 and 55 atomic percent of the nominal sulphur content.

According to a further aspect of the present invention is an electroluminescent device comprising a thin film phosphor as described herein. In a preferred aspect, the electroluminescent device comprises a thick film dielectric.

According to still another aspect of the present invention is a method for making a phosphor material selected from the group consisting of thioaluminates, thiogallates and thioindates having at least one cation selected from elements of Groups IIA and IIB of the Periodic Table of Elements, the phosphor being activated by a rare earth metal and wherein a portion of the sulphur is replaced with oxygen, wherein the phosphor material is deposited as a single homogeneous layer.

According to yet a further aspect of the present invention is a method for making a single phase homogeneous phosphor material having the formula:

$$A_{1-x}D_xZ_2S_{4-y}O_y,$$

wherein
A is a Group IIA or Group IIB cation;
D is a rare earth metal;
Z is selected from Al, Ga and In;
$0.005 < x < 0.1$; and
$1.0 < y < 3.0$, the method comprising introducing oxygen at a temperature in the range of about 800° C. to 1100° C. to a thioaluminate, thiogallate or thioindate compound containing the requisite quantities of A,D Z, wherein the partial pressure of the introduced oxygen is provided in the range of about 0.01 to 15 kilopascals.

The partial pressure of the oxygen is preferably in the range of about 0.1 to 5 kilopascals and more preferably in the range of about 0.2 to 1 kilopascals. The oxygen is introduced for a time sufficient to form the desired material.

In the method the thioaluminate, thiogallate or thioindate compound may contain a portion of the requisite quantity oxygen.

According to yet a further aspect of the present invention is a substantially single phase phosphor film having the formula:

$$A_{1-x}D_xAl_2S_{4-y}O_y,$$

wherein
A is a group IIA cation
D is a rare earth metal;
$0.005 < x < 0.1$; and
$0 < y < 1$, wherein said phosphor film is made by a method comprising;

depositing and crystallizing said phosphor film in a substantially oxygen free atmosphere;

introducing oxygen at a temperature and at a partial pressure range causing said oxygen to diffuse and incorporate within the crystal lattice of the phosphor film resulting in a single phase homogeneous phosphor film. The partial pressure of the oxygen is provided in the range of about 0.01 to 15 kilopascals.

The partial pressure of the oxygen is preferably in the range of about 0.1 to 5 kilopascals and more preferably in the range of about 0.2 to 1 kilopascals. The oxygen is introduced for a time sufficient to achieve the desired concentration of oxygen in the phosphor film. The temperature for introduction of oxygen is in the range of about 650° C. to about 1100° C., preferably about 650° C. to about 850° C. and more preferably about 750° C. to about 850° C. The value for y is preferably $0 < y < 0.1$, with A being preferably barium and D being preferably europium.

The phosphor film is preferably incorporated into an electroluminescent device having a thick film dielectric structure.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will be described with reference to the embodiments shown in the drawings, in which.

DETAILED DESCRIPTION OF THE INVENTION

The present invention relates to the partial replacement of sulphur in a rare earth metal activated thioaluminate, thiogallate or thioindate phosphor with oxygen wherein such partial replacement does not substantially distort or affect the crystal lattice structure of the phosphor material. The oxysulphide phosphors of the invention are characterized by having a homogeneous crystal phase. In other words, the phosphors are a single phase or single layer and not the matrix materials or layered structures of the prior art. This is accomplished by controlling the temperature, partial pressure of oxygen and time of exposure to both during film deposition and/or heat treatment.

In one embodiment, the present invention relates to oxygen as a partial replacement for sulphur in europium activated alkaline earth thioaluminate phosphors, and especially to the incorporation of oxygen in such phosphors when they are deposited as thin films in electroluminescent displays. Such partial replacement provides several advantages with respect to the phosphor material and the electroluminescent display incorporating such phosphor material. In one aspect, the oxygen functions to lower the maximum temperature required in a heat treatment process (annealing) to form a preferred crystal phase. Furthermore, the luminescence of the phosphor composition is enhanced with the partial replacement or substitution of oxygen for sulphur.

A variety of rare earth activators known to those of skill in the art may be used in the phosphor material in conjunction with substituted oxygen, for example cerium and europium. The preferred activator used in conjunction with oxygen is europium. In preferred embodiments of the invention, are partially oxygen substituted barium thioaluminate ($BaAl_2S_{4-x}O_x$) phosphors, which emit blue light.

Figure 1:
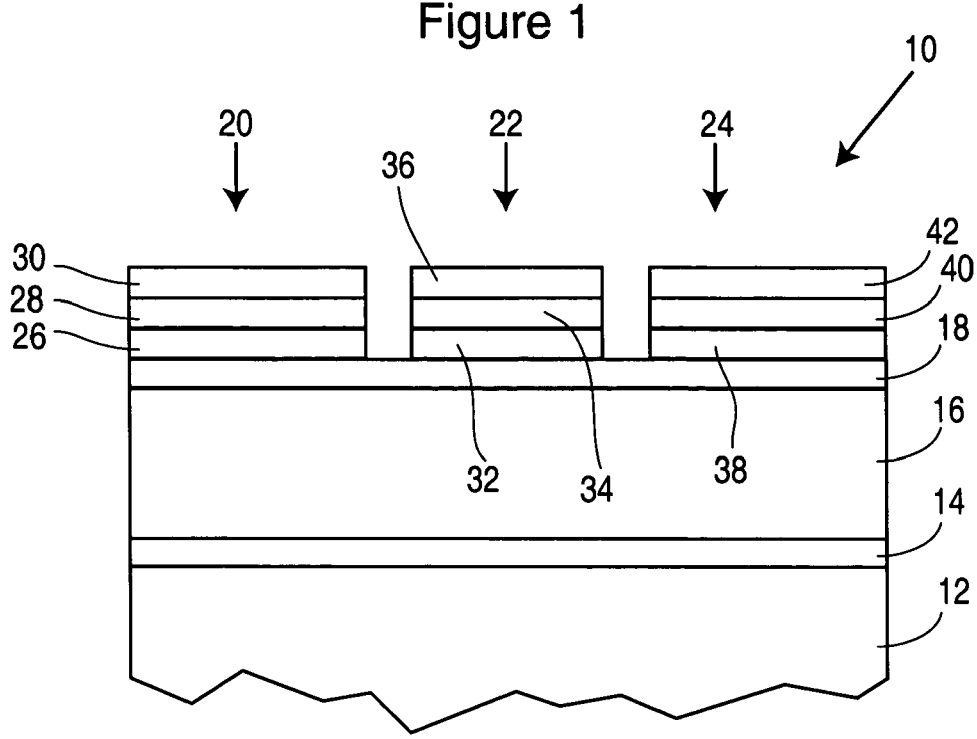
FIG. 1 is a schematic representation of a section of an electroluminescent element comprising a thick film dielectric layer and a phosphor composition typical of the present invention.
Figure 2:
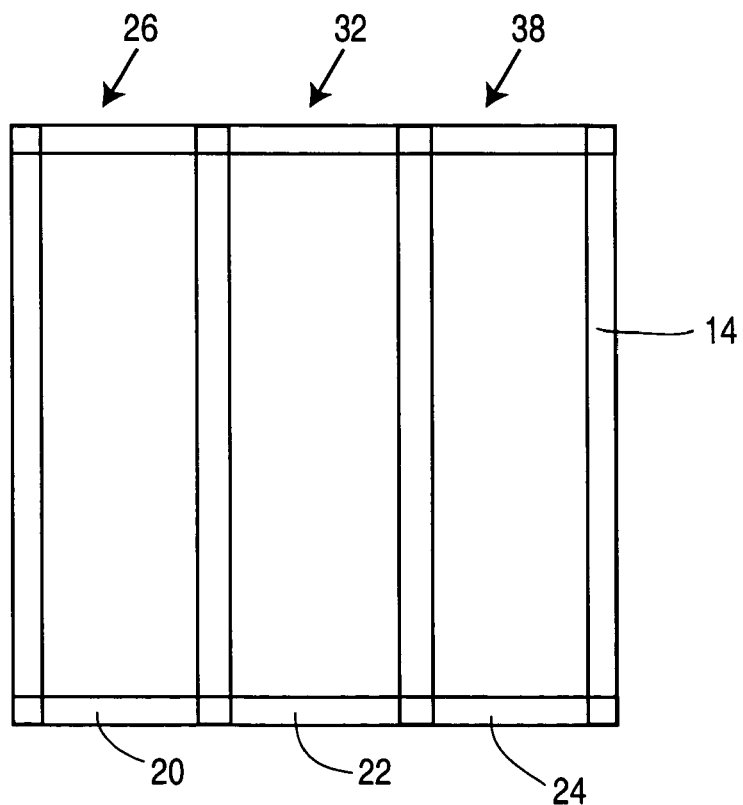
FIG. 2 is a schematic representation of a plan view of a full color electroluminescent pixel and its constituent sub-pixels.

The present invention is suited for use in an electroluminescent display or device shown in FIGS. 1 and 2. FIG. 1 shows a cross-section of an electroluminescent device utilizing a phosphor of the present invention. FIG. 2 shows a plan view of the electroluminescent device. The electroluminescent device, generally indicated by 10, has a base substrate 12 on which is located row electrode 14. Thick film dielectric 16 is provided with a thin film dielectric 18 thereon. Thin film dielectric 18 is shown with three pixel columns, referred to as 20, 22 and 24, located thereon. The pixel columns contain phosphors to provide the three basic colors viz. red, green and blue. Pixel column 20 has red phosphor 26 located in contact with thin film dielectric 18. Another thin film dielectric 28 is located on red phosphor 26, and column electrode 30 is located on thin film dielectric 28. Similarly, pixel column 22 has green phosphor 32 on thin film dielectric 18, with thin film dielectric 34 and column electrode 36 thereon. Pixel column 24 has blue phosphor 38 on thin film dielectric 18, with thin film dielectric 40 and column electrode 42 thereon. In an alternate embodiment, a common thin film dielectric may be deposited over all of the pixels at one time rather than separately deposited dielectric layers over each pixel.

A variety of base substrates may be used, as will be understood by persons skilled in the art. In particular, the base substrate is a rigid refractory sheet that in one aspect has deposited on it an electrically conductive film deposited thereon with a thick dielectric layer deposited on the conductive film. Examples of suitable refractory sheet materials include but are not limited to ceramics such as alumina, metal ceramic composites, glass ceramic materials and high temperature glass materials. Suitable electrically conductive films are known to those of skill in the art such as, but not limited to, gold and silver alloy. The thick film dielectric layer is a structure that comprises ferroelectric material. The thick film dielectric layer may also comprise one or more thin film dielectric layers thereon.

The deposition of the composition may be carried out in an atmosphere containing $H_2S$, sulphur or other volatile sulphur bearing compounds that will not contaminate the phosphor film and optionally a minor concentration of oxygen as it is deposited to minimize a tendency for the deposited compound to be deficient in anions. The deposition source materials should be selected so that they contain a low percentage of oxygen relative to the desired oxygen content of the desired films so that the oxygen content in the films can be accurately controlled by adding oxygen at a controlled rate during deposition and subsequent heat treatment of the deposited film.

In one embodiment, the deposition is done in a hydrogen sulphide atmosphere so that deposited species in the film can react with sulphide derived from the hydrogen sulphide to adequately saturate the deposited film with sulphide so that the desired concentration of oxygen can be added by heat treating the deposited film at a temperature in the range of about 800° C. to about 1100° C. under an atmosphere containing oxygen at a partial pressure in the range of about 0.1 to 5 kilopascals for a time sufficient to achieve the desired oxygen concentration. The oxygen partial pressure is preferably in the range of about 0.2 to 1 kilopascals and the temperature is preferably in the range of about 850° C. to 950° C. to achieve the desired film composition.

If the phosphor is initially deposited with a composition consisting of essentially $BaAl_2S_4$, oxygen can be introduced such that it initially fills atomic vacancies. Once the vacancies are filled, the oxygen displaces a defined fraction of the sulphur atoms in specific atomic sites within the unit cell of the thioaluminate crystal lattice. For example when barium sulphide and aluminum sulphide powders are mixed in an appropriate ratio to form $BaAl_2S_4$ and are heated under an appropriate oxygen partial pressure, the material is observed to absorb oxygen and then evolve sulphur dioxide in two successive chemical reactions. The first reaction is at temperatures in the range of about 460° C. to 480° C. and then the second at temperatures in the range of 570° C. to 600° C. to form compounds with a crystal unit cell substantially close to that of $BaAl_4S_7$ with some leftover barium sulphide. Quantification of the weight loss of the samples during the reactions using a thermogravimetric analyzer and of the mass of oxygen consumed and sulphur dioxide evolved using a mass spectrometer to analyze the off-gas from the reactions, indicates that the first compound formed corresponds approximately to the formula $BaAl_4S_6O$ and the second compound corresponds approximately to the formula $BaAl_4S_5O_2$. As the temperature continues to increase, further reactions occur at temperatures in the range of about 750° C. to 790° C. and then again at a temperatures in the range of about 840° C. to 860° C., whereby the compound formed at lower temperature reacts with the remaining barium sulphide ultimately to form a compound corresponding approximately to the formula $BaAl_2S_2O_2$. The reaction is characterized by consumption of oxygen and evolution of sulfur dioxide. When these reactions have occurred, the crystal structure has changed to one with a unit cell substantially to that of $BaAl_2S_4$.

If the oxygen partial pressure is too high and water vapour is present a different set of reactions occurs involving reactions with water and oxygen starting at a temperature of about 425° C. to form a compound corresponding approximately with the formula $BaAl_4S_2O(OH)_2$.

If the oxygen concentration is too low, sulphur will not be replaced by oxygen, and the final product will be barium thioaluminate, possibly with atomic anion vacancies due to the insufficient partial replacement of sulphur with oxygen.

It is important to control the rate of the reactions by controlling the partial pressure of oxygen as the temperature is raised to form the oxysulphide compounds. If conditions are not such as to allow the various compounds to form in sequence, a single compound will not form and at least a portion of the phosphor material being processed will decompose into two or more of alumina, barium aluminate, barium sulphide and various barium sulfites and sulfates and possibly barium or barium aluminum hydroxides or oxyhydroxides as oxygen continues to be added.

The deposition of the phosphor material may be done using a variety of methods. For example, phosphor deposition can be done by electron beam evaporation, particularly dual source electron beam evaporation as exemplified in Applicant's co-pending U.S. patent application Ser. No. 09/747,315 filed Dec. 22, 2000 (the entirety of which is incorporated herein by reference). Deposition may also be carried out by dual source rf magnetron sputtering wherein there is a facility for injecting and exhausting gases including hydrogen sulphide. In this sputtering process the deposition substrate has a heating means and aluminum sulphide or metallic aluminum is present in one of the sputtering targets, the latter as exemplified in Applicant's co-pending U.S. patent application Ser. No. 09/867,080 filed May 29, 2001 (the entirety of which is incorporated herein by reference). Alternatively deposition can be conducted using thermal evaporation. One of skill in the art would readily comprehend how to deposit the phosphor of the present invention using different methods. Oxygen can be added to the deposition source materials or added during the deposition process provided that the reactions described above during thermal treatment are allowed to proceed substantially in sequence during the combined deposition and thermal treatment process.

Alkaline earth thioaluminates have been reported to have utility as electroluminescent phosphors, but with low luminosity. It has now been demonstrated that improved control of the stoichiometry of the host material facilitates an electroluminescent element with higher luminance. It is presently demonstrated oxygen is used as a partial substitute for sulphur and to fill any anion vacancies in the crystal structure of the thioaluminate compound without substantial alteration of the thioaluminate crystal structure. This facilitates an electroluminescent phosphor with improved luminance stability and at least equivalent luminance and blue colour purity over previously known thioaluminate phosphors.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

The examples are described for the purposes of illustration and are not intended to limit the scope of the invention.

Methods of chemistry, photochemistry and spectrometry referred to but not explicitly described in this disclosure and examples are reported in the scientific literature and are well known to those skilled in the art.

Example 1

Figure 3:
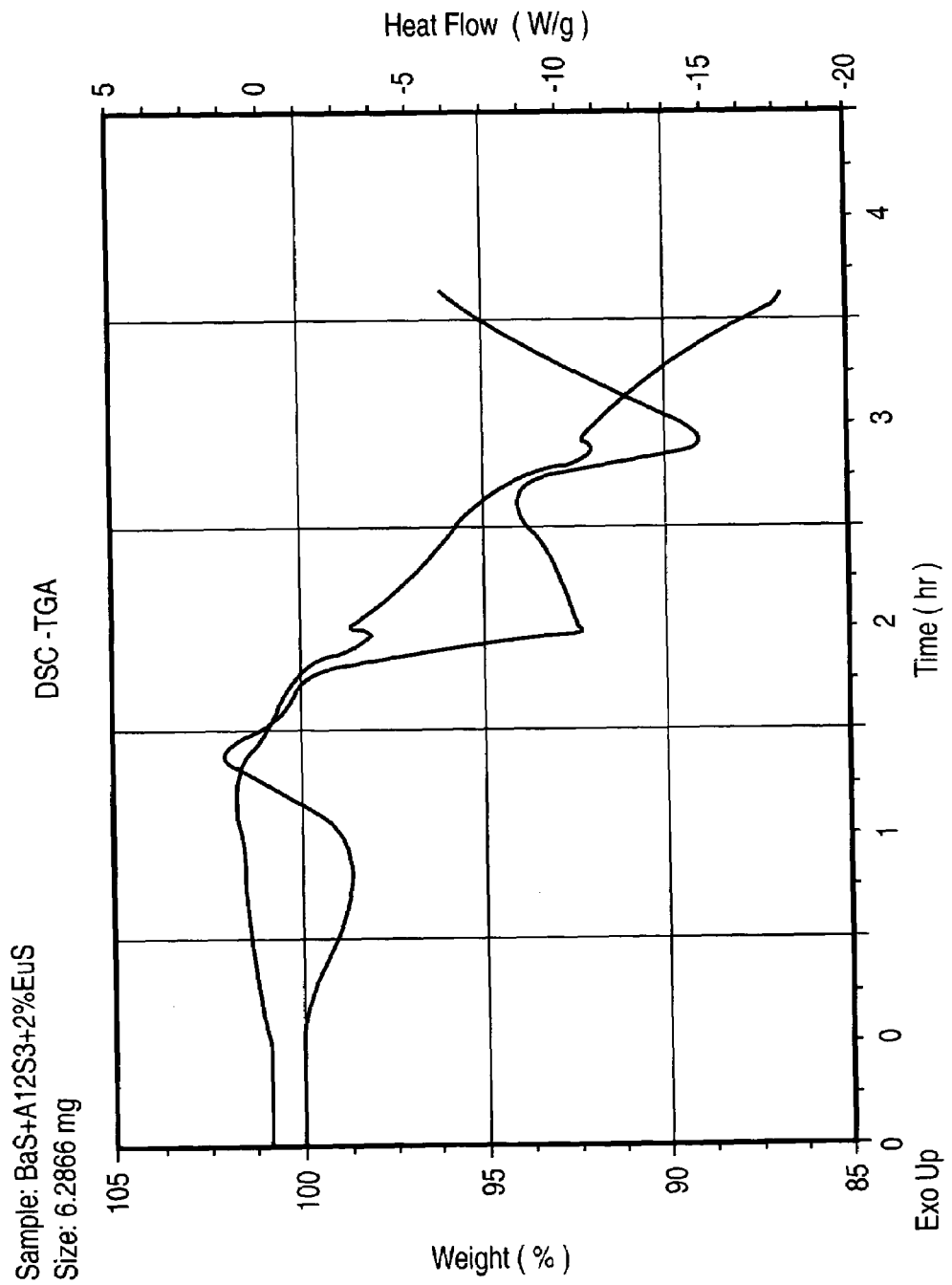
FIG. 3 is a graph demonstrating the observed weight changes of and heat flow to or from a sample consisting of components in the correct proportions to form barium thioaluminate as it is heated under argon containing 2000 ppm of oxygen at a rate of 5° C. per minute.
Figure 4:
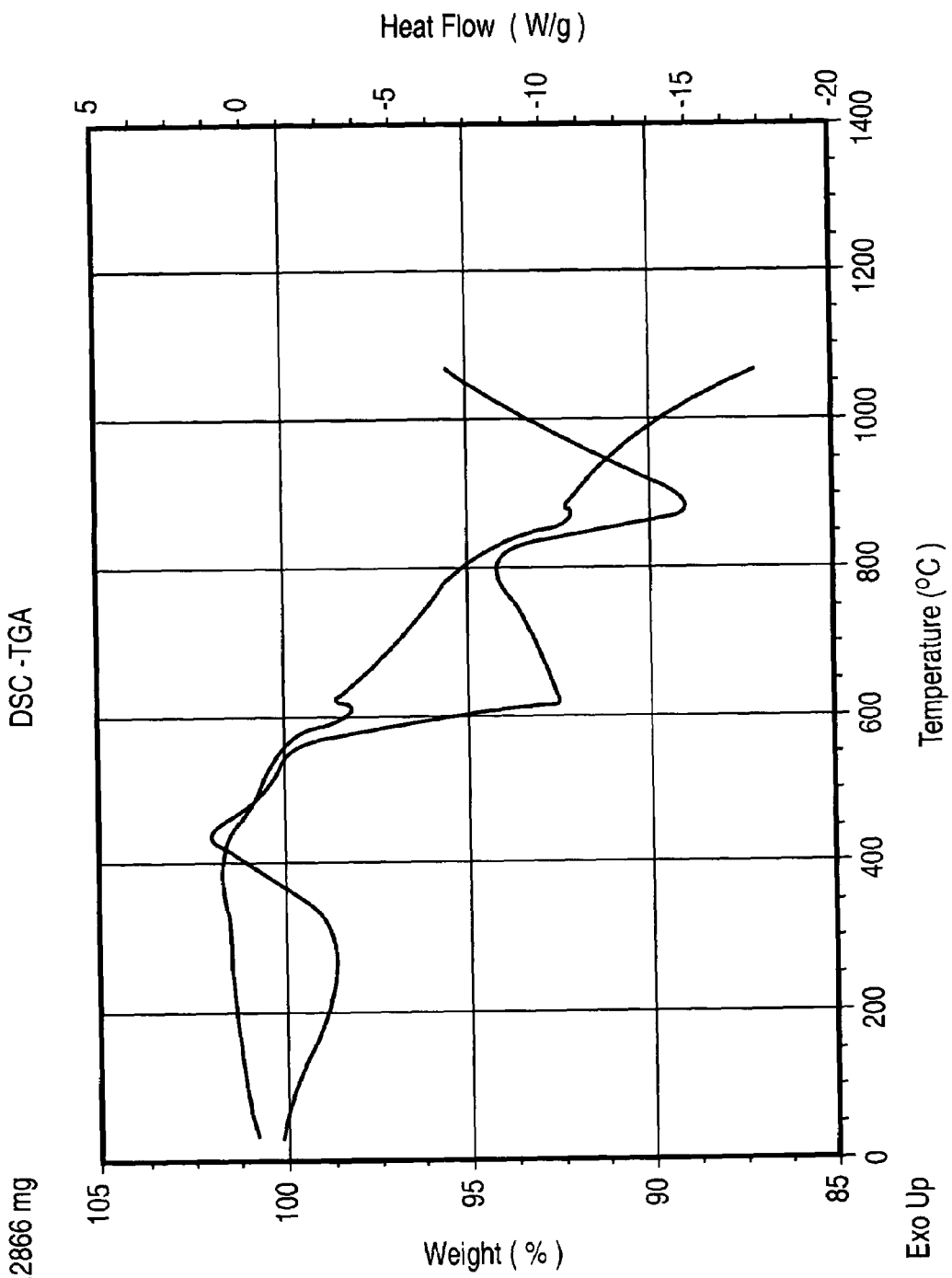
FIG. 4 is a graph showing the data in FIG. 3 as a function of temperature.
Figure 5:
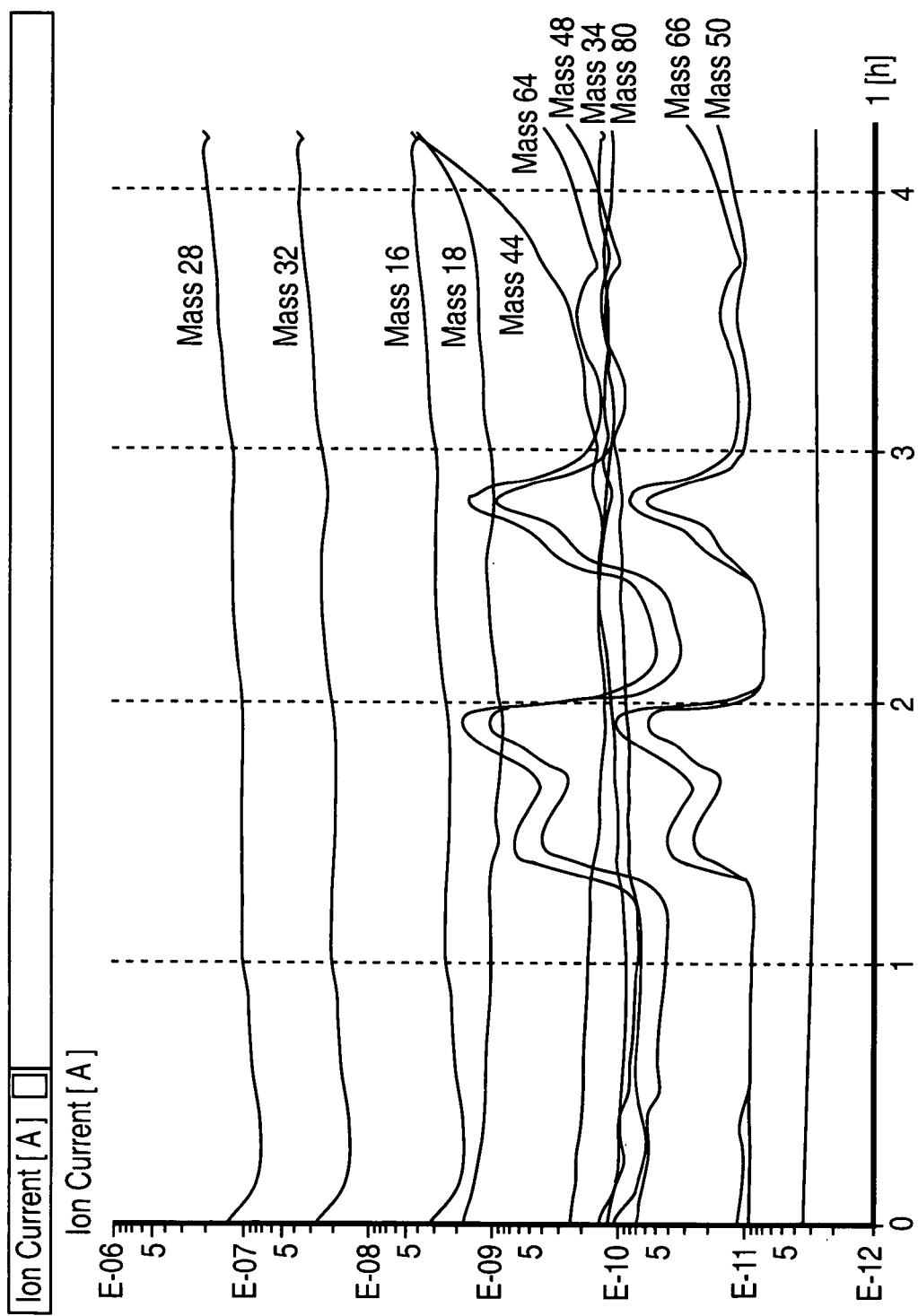
FIG. 5 is a graph showing the concentration of atomic species in the off-gas from the sample of FIG. 3 measured using mass spectroscopy.

A powder containing barium sulphide and aluminum sulphide in an appropriate ratio to form barium thioaluminate ($BaAl_2S_4$) were prepared using a blending process. Approximately 8 milligrams of the blended powder was placed into an alumina crucible and placed in a combined thermogravimetric analyzer and differential scanning calorimeter to which was fitted a mass spectrometer to quantitatively analyze the process gas passed over the sample. The process gas consisted of argon containing 2000 ppm of oxygen as a dopant. FIG. 3 shows as a function of time the weight changes for the sample and the heat transfer to or from the sample as it was heated at 5° C. per minute. FIG. 4 shows the same data as a function of temperature. FIG. 5 shows the corresponding mass spectroscopy data for the process gas as a function of time. Discrete reactions occurring at about 490° C., 600° C., 780° C. and 850° C. are evident from the data. The weight data shows an initial weight gain below 490° C., followed by weight loss at 490° C., then weight gain again above 490° C. followed by weight loss at 600° C. As the temperature continued to rise, the sample weight increased again until 780° C. and then abruptly lost weight at 850° C. Following on from this the weight increased again before stabilizing near 1050° C. This staircase effect is explained by the sample gaining oxygen to fill anion vacancies when the weight is increasing and that sulphur is being displaced and evolved as sulphur dioxide when the weight is decreasing.

Analysis of the weight changes in combination with quantification of the consumed and evolved gas provided a means to deduce the nature of the compounds formed at each step as discussed above. The heat flow data shows endothermic reactions corresponding to the evolution of sulphur dioxide from the samples. Hydrogen sulphide is identified by its mass spectroscopy fragmentation pattern comprising atomic mass units 48, 50, 64 and 66. There is no coinciding consumption of water vapour from the process gas, but there is consumption of oxygen. The final product formed just above 850° C. was found by x-ray diffraction to be that of a compound with unit cell dimensions substantially to that of barium thioaluminate ($BaAl_2S_4$). The weight gain above this temperature may be due to the filling of anion vacancies in this structure with oxygen. The overall mass spectroscopic and mass balance analysis indicates that the compound has a chemical composition of approximately $BaAl_2S_2O_2$. Evolution of carbon dioxide at temperatures above 1100° C. is also observed that may be due to oxidation of carbides or decomposition of carbonates initially present as an impurity in the samples or in the crucible.

Example II

Figure 6:
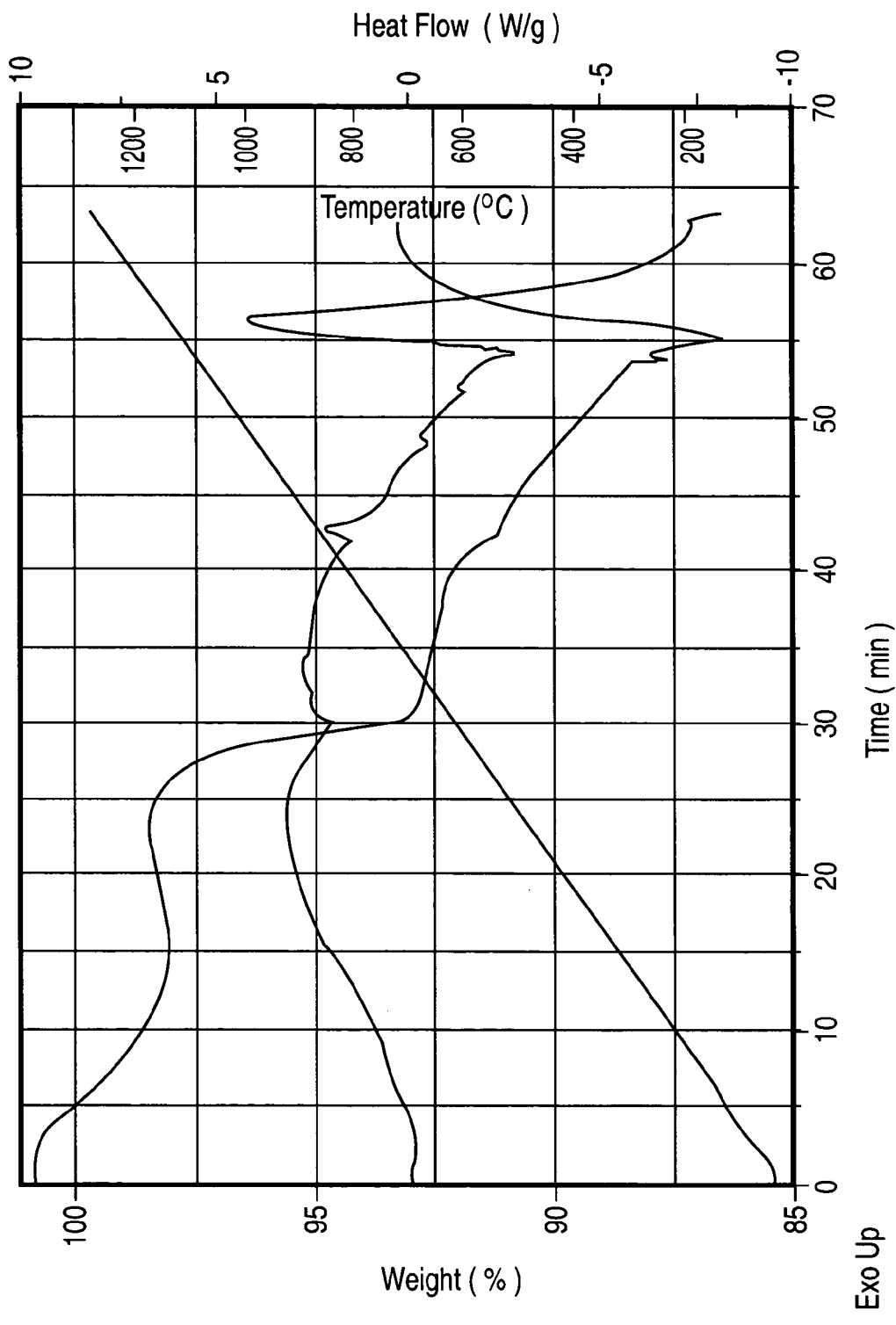
FIG. 6 is a graph demonstrating the temperature and observed weight changes of and heat flow to or from a sample consisting of components in the correct proportions to form barium thioaluminate as it is heated under argon containing 2000 ppm of oxygen at a rate of 20° C. per minute.
Figure 7:
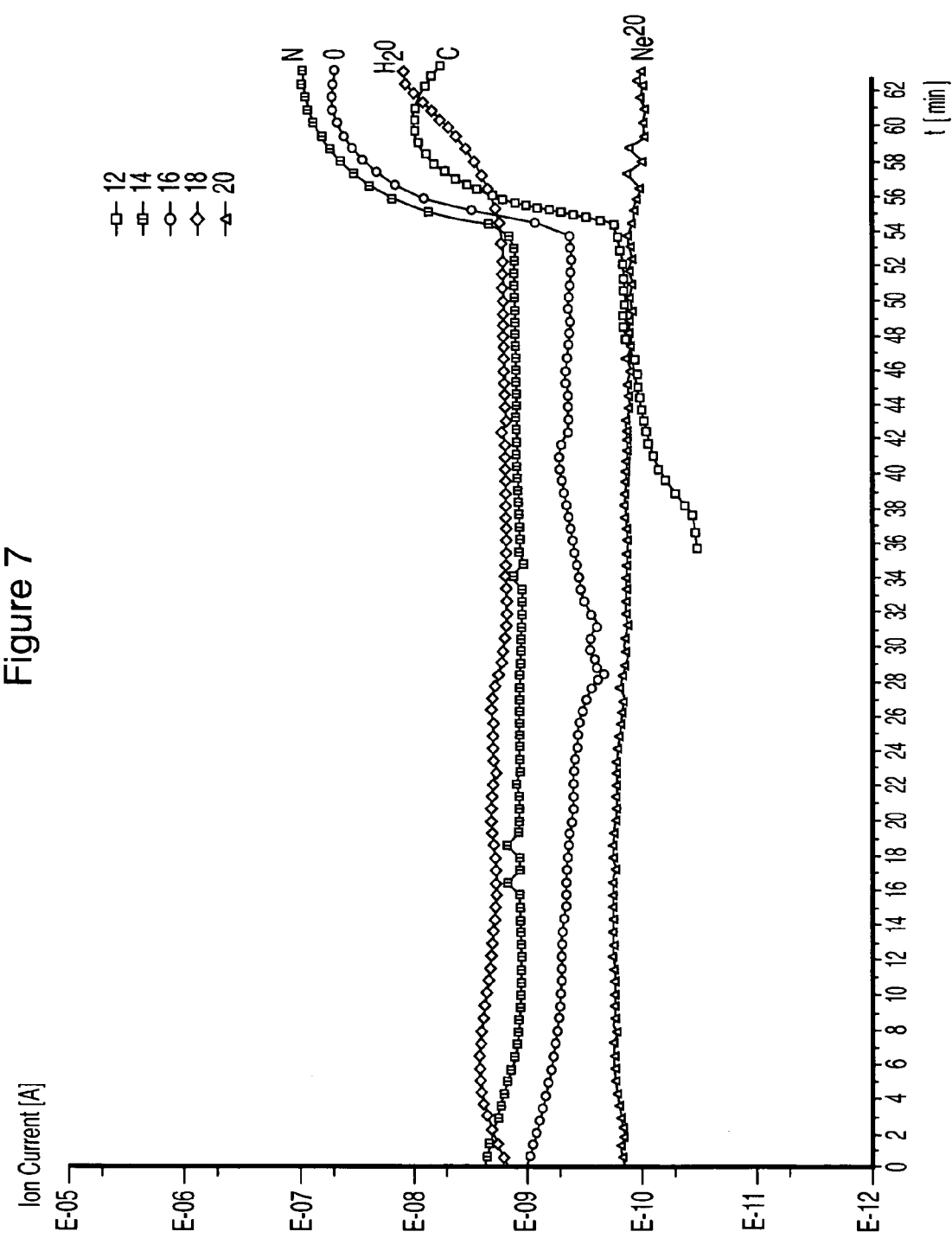
FIG. 7 is a graph showing the concentration of atomic species with atomic mass between 12 and 20 in the off-gas from the sample of FIG. 5 measured using mass spectroscopy.
Figure 8:
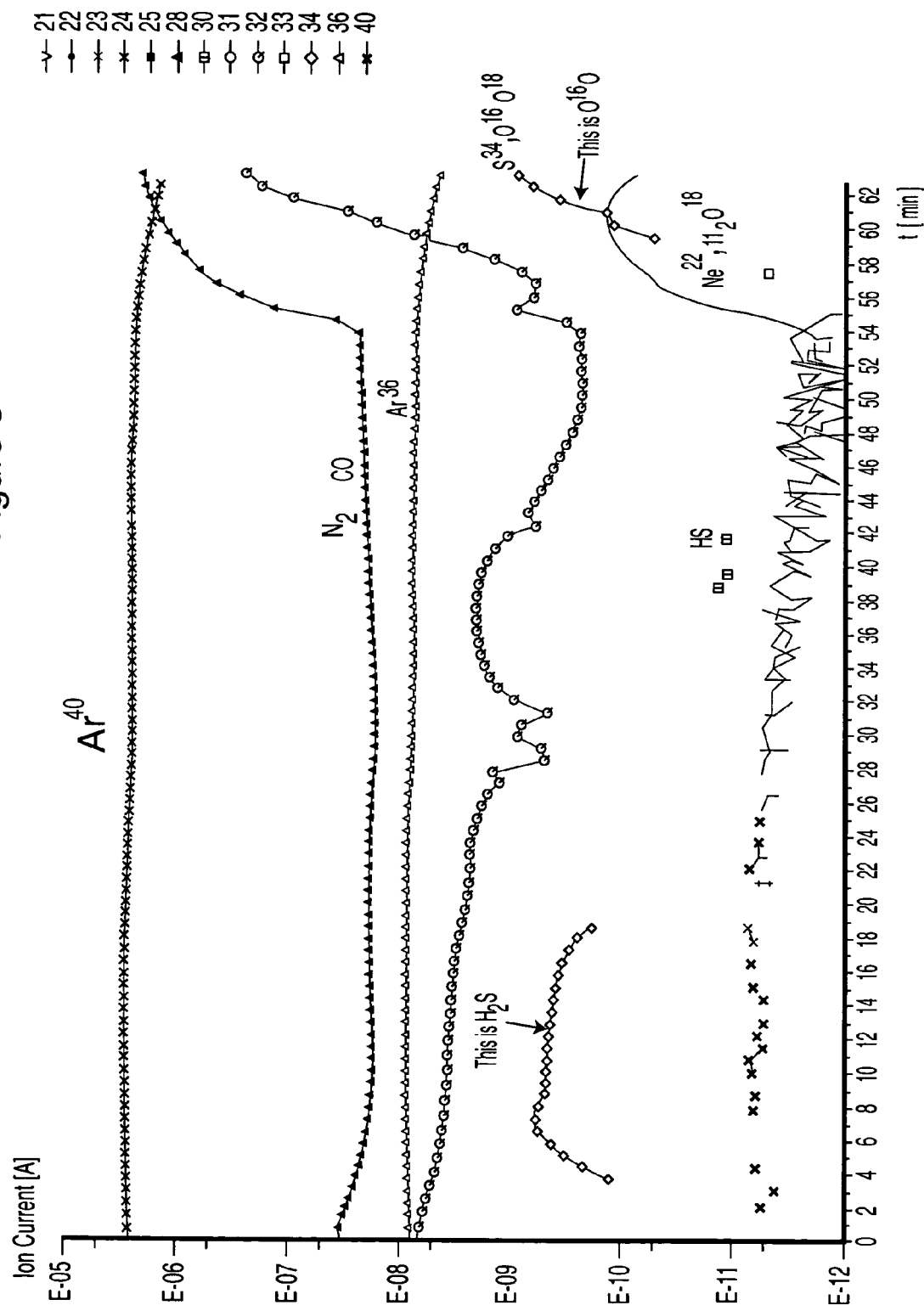
FIG. 8 is a graph showing the concentration of atomic species with atomic mass between 21 and 40 in the off-gas from the sample of FIG. 5 measured using mass spectroscopy.
Figure 9:
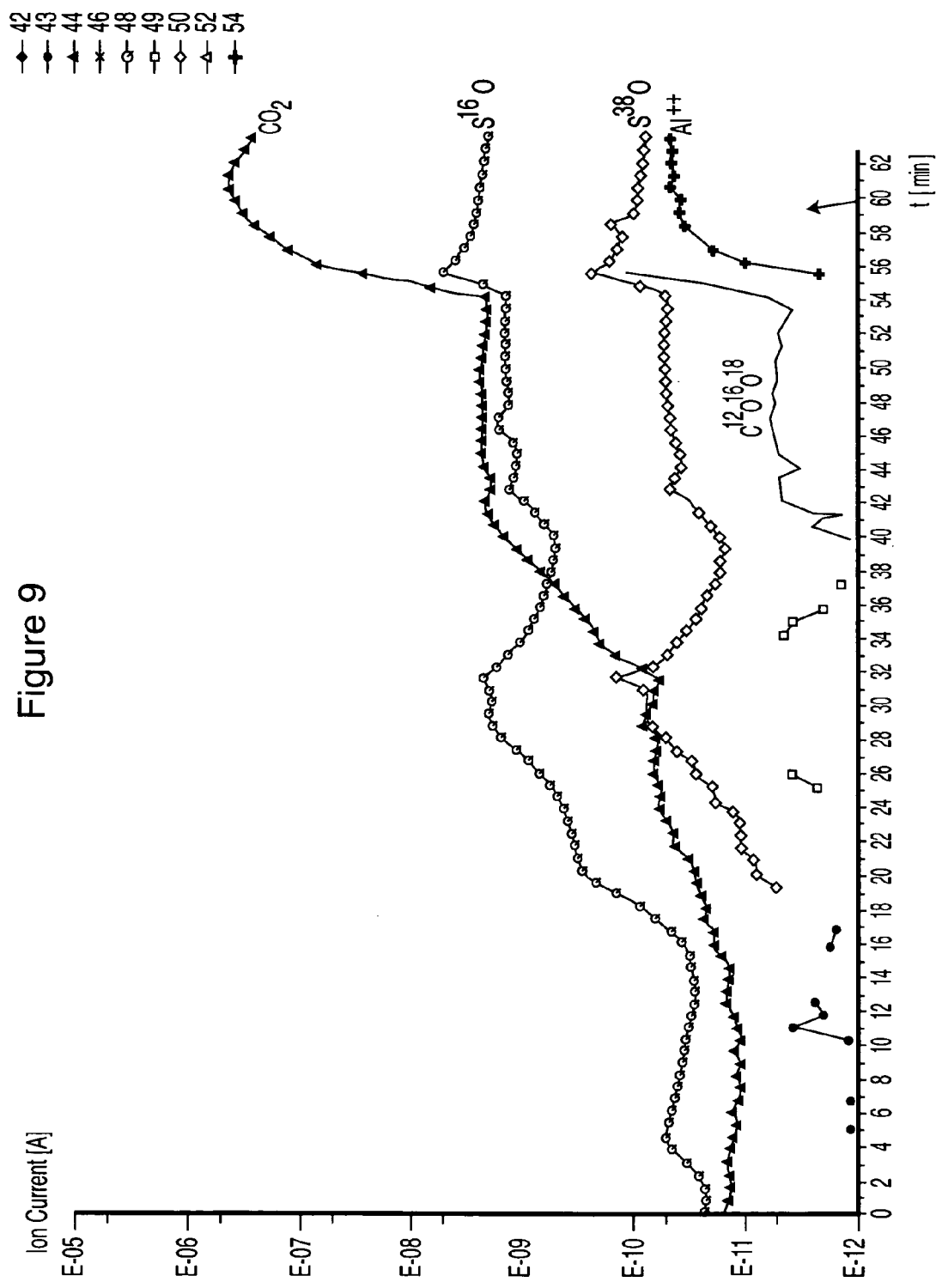
FIG. 9 is a graph showing the concentration of atomic species with atomic mass between 42 and 54 in the off-gas from the sample of FIG. 5 measured using mass spectroscopy.
Figure 10:
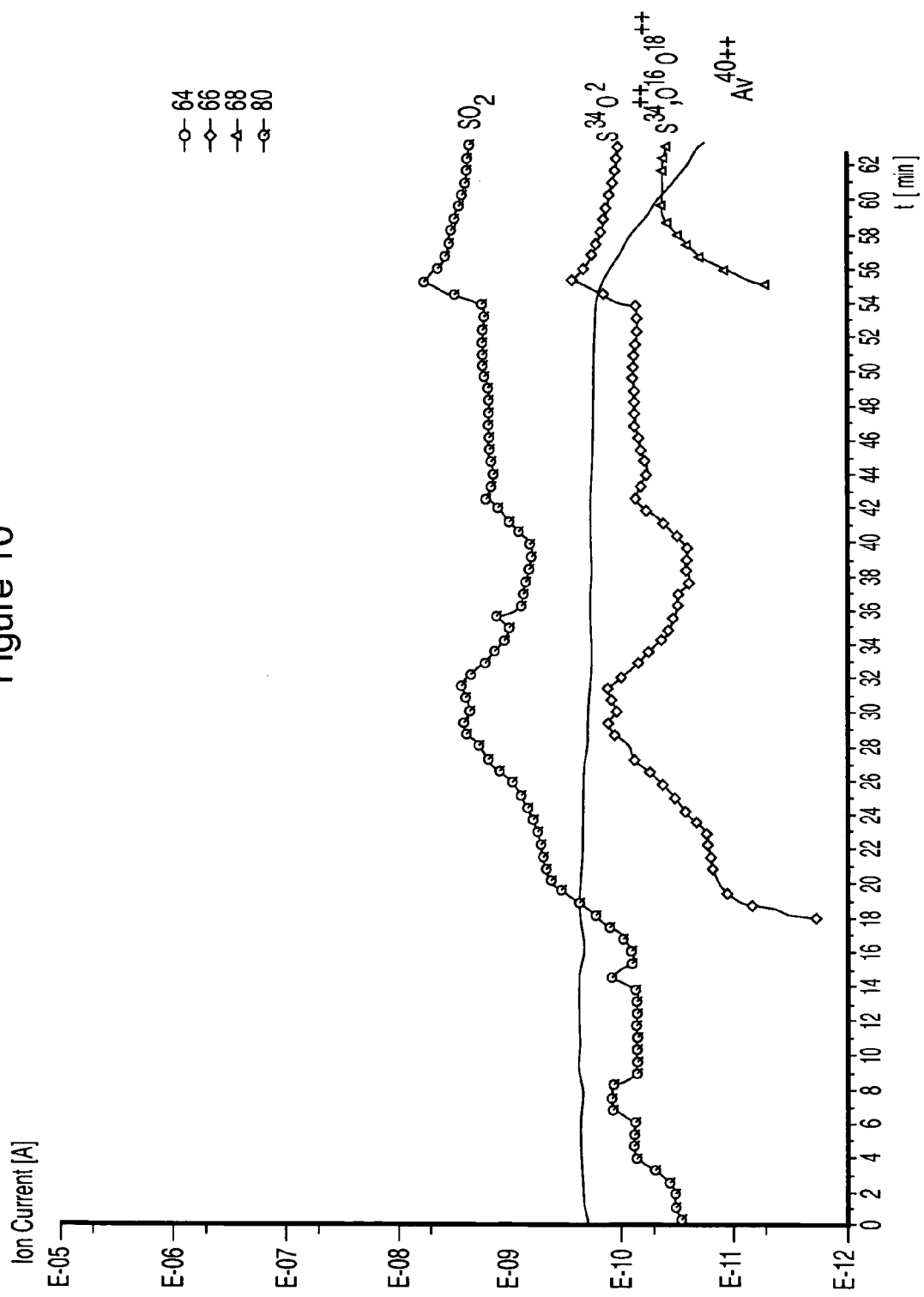
FIG. 10 is a graph showing the concentration of atomic species with atomic mass between 64 and 80 in the off-gas from the sample of FIG. 5 measured using mass spectroscopy.

A 4.3 milligram powder sample similar to that in Example 1 was subject to combined thermogravimetric analysis, differential scanning calorimetry and mass spectroscopic analysis of the process gas. For this example the process gas was also 2000 ppm of oxygen in argon, but the temperature ramp rate was about 20° C. per minute rather than 5° C. per minute. The weight change of the sample, the heat flow to or from the sample and the sample temperature are shown as a function of time in FIG. 6. The mass spectroscopy data for the process gas is shown in FIG. 7 for atomic mass units 12 through 20, in FIG. 8 for atomic mass units 21 through 40, in FIG. 9 for atomic mass units 42 through 54 and in FIG. 10 for mass units 64 to 80. In this example, the reactions occurring at about 490° C. and 600° C. are accompanied by a weight loss. Similarly the reactions at about 780° C. and 840° C. are accompanied by weight loss which continues beyond 850° C. rather than a weight gain as in example 1. The overall weight change is similar and the end product has a similar composition. Any observed differences in the weight changes are likely due to less time being available for each reaction in the series of reactions to go to completion before the onset of the next reaction. For this example, the instantaneous rate of reaction was higher, and the reduction in the oxygen concentration as the reactions consume oxygen as measured by the concentration of mass units 16 and 32 in FIGS. 7 and 8 is more apparent than it was for example 1.

The calorimetry data shows endothermic peaks associated with the reactions, as in Example 1, but an exothermic rather than an endothermic peak at 840° C., indicating that a substantial internal reorganization of the crystal lattice occurred, but that less sulphur dioxide was evolved, reducing the size of a coincident endotherm. There are also small heat anomalies at 950° C., 980° C. and 1060° C., indicating the likelihood of incipient reactions at these temperatures, suggesting that the reaction at 850° C. had not gone to completion. At 1100° C., the process gas was switched to air, at which point a substantial exotherm is observed coinciding with a significant sample weight gain, as well as a significant increase in carbon dioxide (mass unit 44) in the process gas stream that may be due to oxidation of carbides in the sample or the crucible. Also observed are a brief dip in the oxygen concentration as it is rising with the introduction of air and a corresponding peak in sulfur dioxide (mass units 44, 46, 64 and 68). Analysis of the mass spectroscopy results in combination with the mass balance of the sample indicates that the $BaAl_2S_2O_2$ compound formed with 2000 ppm oxygen in argon reacted with the air to directly form alumina and barium sulfate.

Example III

This example illustrates how potentially undesirable compounds can form in association with phosphor materials when the phosphor materials are heated in air.

Figure 11:
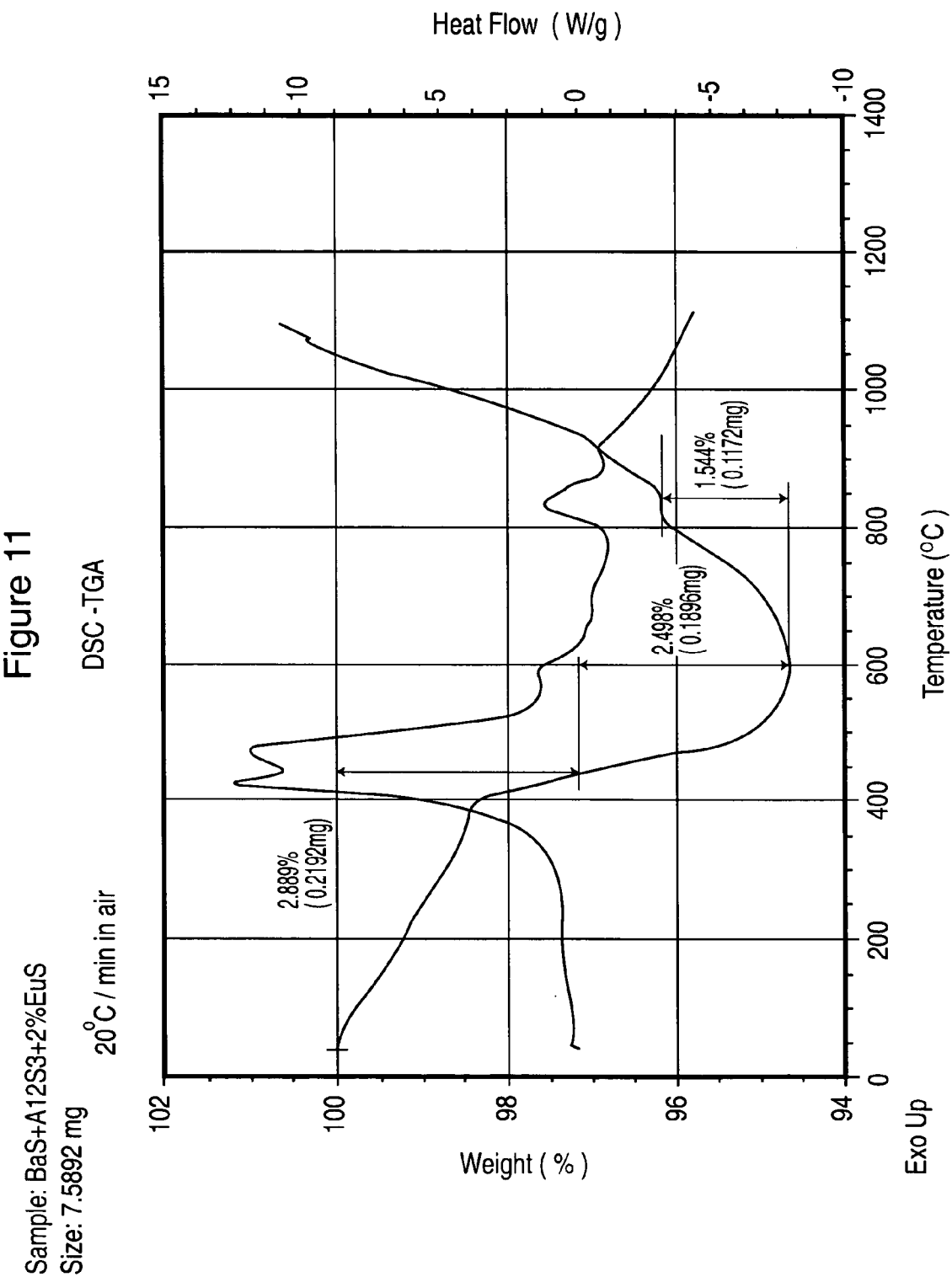
FIG. 11 is a graph showing the observed weight changes of and heat flow to or from a sample consisting of ingredients in the correct proportions to form barium thioaluminate as it is heated under air at a rate of 20° C. per minute.
Figure 12:
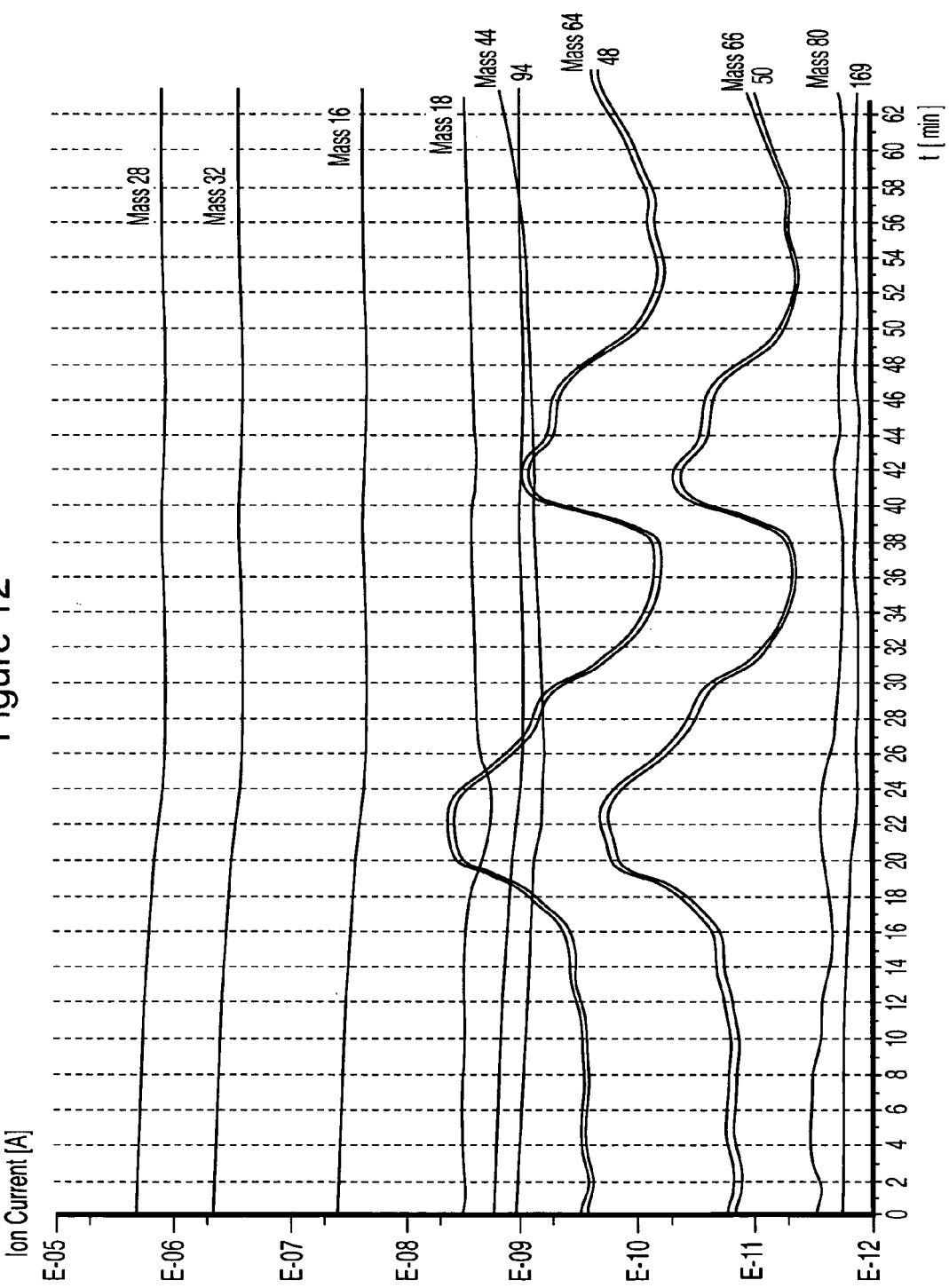
FIG. 12 is a graph showing the concentration of atomic species in the off-gas from the sample of FIG. 11 measured using mass spectroscopy.

A 7.5 milligram sample similar to that in the previous examples was subject to combined thermogravimetric, differential scanning calorimetry and mass spectroscopy measurements using air as a process gas. In this case substantial exotherms were observed at 420° C. and 475° C. and a much weaker exotherm at 600° C. The thermogravimetric and calorimetric data is shown in FIG. 11. The corresponding mass spectroscopy data is shown in FIG. 12.

The mass spectroscopy data indicates that the reactions at 420° C. and 475° C. involve consumption of water vapour and oxygen as evidenced by the atomic mass 18 and atomic mass 32 data and evolution of sulphur dioxide, but not hydrogen sulphide. This data combined with the mass balance data indicates that a compound with a composition approximately represented by the formula $BaAl_2S_2O(OH)_2$ is formed. The formation of this compound precludes the formation of $BaAl_2S_2O_2$ at a later step. Suppression of reactions resulting in the formation of compounds containing hydroxide ions can be accomplished by lowering the oxygen concentration, as in examples 1 and 2, since these reactions require the consumption of both water and oxygen, and the reaction equilibrium constant would tend to shift the equilibrium point for the reaction back in favour of the reactants under low oxygen pressure. The shift could equally be accomplished by lowering the water vapour pressure, but this is more difficult to achieve in practice due to the tendency for water to be absorbed in to the materials.

It is advantageous to suppress the formation of hydroxide ion-containing compounds, as the contained hydrogen is mobile and can contribute to electrochemically driven degradation of phosphor materials during electroluminescent device operation.

Example IV

Figure 13:
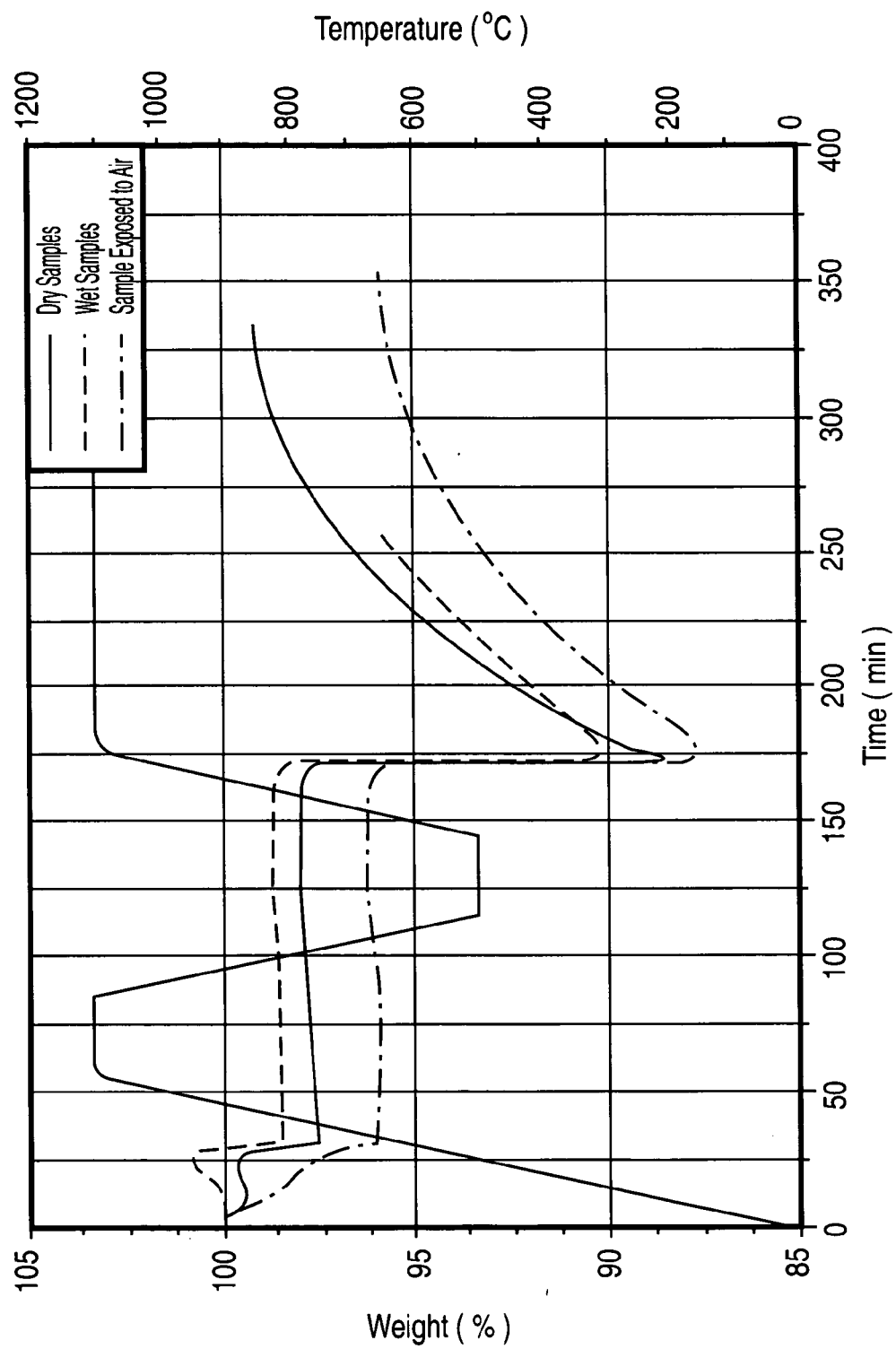
FIG. 13 is a graph showing the temperature and weight changes of and the heat flow to or from a sample consisting of ingredients in the correct proportions to form barium thioaluminate as it is heated under argon containing 125 ppm of oxygen according to the noted temperature profile.

Three 20 milligram samples exposed to varying degrees to moisture laden air prior to analysis were subject to combined thermogravimetric analysis and differential scanning calorimetry as they were heated under argon doped with 125 ppm of oxygen. The temperature was increased at 20° C. per minute to a temperature of 1100° C., held at that temperature for 30 minutes before cooling at 20° C. per minute to 500° C. The process gas was then switched to air and the samples were reheated to 1100° C., then held at 1100° C. for several hours. The data is shown in FIG. 13. From the figure it can be seen that the samples lost between 2 and 4 percent of their weight upon heating to 600° C. The differences are presumed due to a variable oxide or hydroxide content due to reaction of the sulphide materials with at least one of oxygen and moisture from the air. Above 600° C., the samples gained about 0.5% in weight. Following cooling and upon reheating under air, the sample weight was stable until the temperature reached 1060° C., at which point the samples within a few seconds suffered about a 10% weight loss. As the temperature was maintained at 1100° C., the samples slowly regained weight to achieve essentially their original weight. The weight changes in the sample at 1060° C. correspond approximately to a reaction product comprising barium sulphide and alumina. The subsequent weight gain is associated with conversion of the barium sulphide to barium sulfate. These reaction products were confirmed with x-ray diffraction measurements on fresh samples taken to the respective points in the thermal program.

Figure 14:
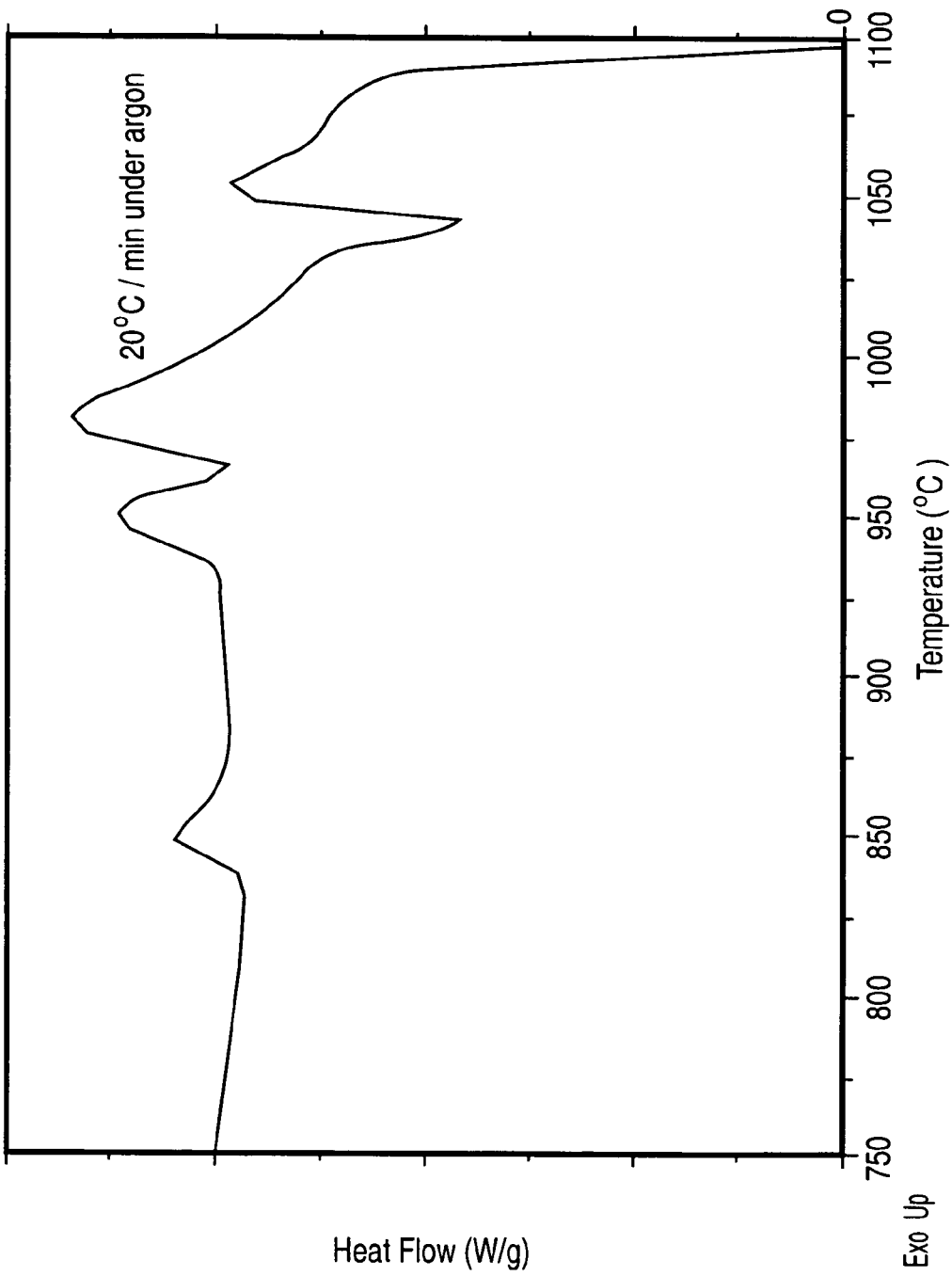
FIG. 14 is a graph showing the heat flow to or from a sample similar to that shown in FIG. 13 at temperatures between 750° C. and 1100° C.

Comparison of x-ray diffraction patterns of two additional samples, one cooled quickly to room temperature following the initial heating period at 1100 C and the other cooled just before it could lose significant weight during the second heat-up in air showed that both samples comprised a single phase material with essentially the same crystal lattice parameters, but that the relative intensities of the diffracted lines of the samples were different in a manner that indicated that the arrangement of atoms within the crystal unit cell were different, consistent with vacancies in the crystal lattice being filled with oxygen atoms. The foregoing analysis is consistent with $BaAl_2S_{4-x}$ forming that slowly absorbs oxy gen in the oxygen doped argon atmosphere to form $BaAl_2S_{4-x}O_x$ where x is about 0.1. This compound decomposes suddenly in air at 1060° C. to form a product comprising primarily barium sulphide and alumina, and minor quantities of barium aluminate. The thermal analysis data in the temperature range 750° C. to 1100° C. for heating under argon containing 125 ppm of oxygen is expanded in FIG. 14. It shows exothermic anomalies at 840° C., 950° C. 980° C. and an endothermic anomaly at 1040° C. corresponding to the initiation of the fast decomposition under air at 1060° C. The exothermic anomaly at 980° C. is the largest. This data is compared to the calorimetry data in the same temperature for the sample of example 1 and 2. In example 1, the anomaly at 840° C. was endothermic and the others were not present. In example 2, the anomaly at 840° C. was exothermic and the remainder were present but barely perceptable. These results suggest that the anomalies correspond to temperatures at which there are incipient crystallographic phase transitions in the sulphide material with attendant high oxygen mobility and that if sufficient oxygen is present an oxysulphide compound will form. If there is insufficient oxygen, the reaction may partially occur, but leaving a portion of the material remaining as sulphide until another temperature is reached where an incipient instability exists. At this point oxysulphide formation is again accelerated, but only to the extent that the oxygen supply facilitates. As the temperature increases, additional frustrated oxygen consuming reactions occur until the material is fully saturated with oxygen, or until the last instability point is passed.

Example V

Two thick dielectric electroluminescent devices incorporating thin film phosphor layers comprising barium thioaluminate activated with europium were constructed. The thick film substrate was comprised of a 5 cm by 5 cm alumina substrate having a thickness of 0.1 cm. A gold electrode was deposited on the substrate, followed with a thick film high dielectric constant dielectric layer in accordance with the methods exemplified in Applicant's co-pending international application PCT CA00/00561 filed May 12, 2000 (the entirety of which is incorporated herein by reference). A thin film dielectric layer consisting of barium titanate, with a thickness of about 100–200 nanometers, was deposited on top of the thick film dielectric layer using the sol gel technique described in Applicant's co-pending U.S. patent application Ser. No. 09/761,971 filed Jan. 17, 2001 (the entirety of which is incorporated herein by reference).

The phosphor film was electron beam evaporated on top of the barium titanate layer using dual source electron beam evaporation, according to the methods described in Applicant's co-pending U.S. patent application Ser. No. 09/747,315 filed Dec. 22, 2000 (the entirety of which is incorporated herein by reference). The two evaporation sources were aluminum sulphide and a fused mixture of barium sulphide and europium sulphide in the form of pellets. The phosphor deposition was carried out in a low pressure atmosphere of hydrogen sulphide at a pressure of about $8 \times 10^{-5}$ to about $2 \times 10^{-4}$ torr and with the substrate at a temperature in the range of about 350° C. to 500° C. The deposition was carried out by electron beam evaporation using the dual sources. The deposition rate of the aluminum sulphide, as measured in the absence of the remaining constituents using a quartz crystal monitor, was in the range of 5 to 7 Angstroms per second and the deposition rate of the remaining constituents in the absence of aluminum sulphide, also as measured using a quartz crystal monitor, was in the range of 3.5 to 5.5 Angstroms per second. The deposited phosphor film thickness was in the range of about 3000 to 4500 Angstroms.

Prior to heat treatment, the elemental composition of the phosphor layer was measured using energy dispersive analysis by x-rays (EDX) and the atomic ratio of oxygen to sulphur was found to be in the range of about 0.1 to 0.2.

Following deposition, the phosphor-coated substrates were heat treated under an argon atmosphere containing 10% of oxygen at a temperature of about 850° C. for about 2 minutes. A 50 nanometer thick alumina thin film and an indium tin oxide transparent conductor were deposited over the phosphor to provide a second electrode.

For comparative purposes a second device constructed in a similar manner was constructed, but with an oxygen to sulphur ratio prior to heat treatment in the range of about 2:1 to 3:1 and a heat treatment atmosphere consisting of pure nitrogen at a temperature of about 700° C.

The two devices were tested using alternating polarity 32 microsecond wide square-wave pulses and a frequency of 120 Hz giving 240 light pulses per second. The pulse amplitude was varied in increments of 10 volts up to 260 volts. The former device was operated for about 1000 hours before losing half of its initial luminance compared to about 100 hours for the latter device.

The invention claimed is:

1. A thin film phosphor for an electroluminescent device, said phosphor being a thioaluminate having a barium cation and being activated by europium, and containing oxygen as a partial substitute for the sulphur in said thioaluminate, and wherein said europium is contained in an amount in the range of about 2–7 atomic percent of the amount of barium, and oxygen is substituted in the crystal lattice structure of said compound providing a ratio of oxygen to sulphur in the range of about 0.4 to 1.6, wherein said phosphor is a homogeneous single phase.

2. The thin film phosphor of claim 1, wherein said ratio of oxygen to sulphur is in the range of about 0.8 to 1.2.

3. The thin film phosphor of claim 1, wherein said phosphor is $Ba_{0.97}Eu_{0.03}Al_2S_{4-x}O_x$, and $1.5<x<2.5$.

4. An electroluminescent device comprising a thin film phosphor of claim 1.

5. An electroluminescent device of claim 4, wherein said thin film phosphor is provided on a base substrate.

6. The device of claim 5, wherein said base substrate comprises a refractory material additionally comprising an electrically conductive film deposited thereon and a thick film dielectric is deposited on said electrically conductive film.

7. The device of claim 6, wherein said refractory material is selected from the group consisting of a ceramic, a metal ceramic composite, and a high temperature glass.

8. The device of claim 7, wherein said refractory material is alumina.

9. The device of claim 8, wherein said electrically conductive thin film is selected from the group consisting of gold and silver alloy.

10. The device of claim 9, wherein said thick film dielectric comprises ferroelectric material.

11. The device of claim 10, wherein said ferroelectric material is selected from the group consisting of lead magnesium niobate titanate, lead zirconate titanate, barium titanate and mixtures thereof.

12. The device of claim 11, wherein said thick film dielectric additionally comprises one or more thin film dielectric layers thereon.

13. The device of claim 12, wherein device additionally comprises a thin film dielectric layer on top of said thin-film phosphor.

14. A phosphor material having the formula:

$$A_{1-x}D_xZ_2S_{4-y}O_y,$$

wherein
A is barium;
D is europium;
Z is Al;
$0.005<x<0.1$; and $1.0<y<3.0$, wherein said phosphor material is a homogenous single phase.

15. The phosphor of claim 14, wherein said oxygen does not substantially distort or negatively affect the crystal lattice structure of said compound.

16. The phosphor of claim 15, wherein $1.6<y<2.4$.

17. The phosphor of claim 14, wherein said phosphor is $Ba_{0.97}Eu_{0.03}Al_2S_{4-y}O_y$, and $1.5<y<2.5$.

18. A phosphor material made by the method comprising: introducing oxygen at partial pressure of about 0.01–15 kilopascals and at a temperature in the range of about 800° C. to 1100° C. to a thioaluminate, compound containing requisite quantities of A,D Z, for a time sufficient to form the desired single phase homogeneous material of $A_{1-x}D_xZ_2S_{4-y}O_y$, where A is barium; D is europium; Z is Al; $0.005<x<0.1$; and $1.0<y<3.0$.

19. An electroluminescent display comprising the phosphor material of claim 18.

20. The display of claim 19, wherein said display comprises a thick film dielectric.

21. A single phase phosphor film having the formula;

$$A_{1-x}D_xAl_2S_{4-y}O_y,$$

wherein
A is a group IIA cation
D is a rare earth metal;
$0.005<x<0.1$; and
$0<y<1$,
wherein said phosphor film is made by a method comprising;
depositing and crystallizing said phosphor film in a substantially oxygen free atmosphere;
introducing oxygen at a temperature and at a partial pressure range causing said oxygen to diffuse and incorporate within the crystal lattice of the phosphor film resulting in a single phase homogeneous phosphor film.

22. The phosphor film of claim 21, wherein said oxygen is introduced into said crystal lattice of said phosphor film without causing precipitation of any oxygen containing phases in said phosphor film.

23. The phosphor film of claim 21, wherein the partial pressure of the oxygen is provided in the range of about 0.1 to about 5 kilopascals.

24. The phosphor film of claim 23, wherein the partial pressure of the oxygen is provided in the range of about 0.01 to 15 kilopascals.

25. The phosphor film of claim 24, wherein the partial pressure of the oxygen is provided in the range of about 0.2 to about 1 kilopascals.

26. The phosphor film of claim 21, wherein said temperature is about 650° C. to about 850° C.

27. The phosphor film of claim 21, wherein said temperature is about 750° C. to about 850° C.

28. The phosphor film of claim 21, wherein y is $0<y<0.1$.

29. The phosphor film of claim 27, wherein A is barium and D is europium.

30. The phosphor film of claim 21, wherein said film is incorporated within an electroluminescent device comprising a thick film dielectric.

31. The device of claim 7, wherein said ceramic is selected from the group consisting of alumina and glass ceramic.

* * * * *